(12) United States Patent
Ma et al.

(10) Patent No.: US 8,532,301 B2
(45) Date of Patent: Sep. 10, 2013

(54) KEY DISTRIBUTION METHOD AND SYSTEM

(75) Inventors: Jingwang Ma, Shenzhen (CN); Qian Jia, Shenzhen (CN); Wantao Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 149 days.

(21) Appl. No.: 13/126,174

(22) PCT Filed: Aug. 12, 2009

(86) PCT No.: PCT/CN2009/073222
§ 371 (c)(1),
(2), (4) Date: Apr. 27, 2011

(87) PCT Pub. No.: WO2010/048829
PCT Pub. Date: May 6, 2010

(65) Prior Publication Data
US 2011/0211699 A1 Sep. 1, 2011

(30) Foreign Application Priority Data
Oct. 28, 2008 (CN) .......................... 2008 1 0168359

(51) Int. Cl.
H04L 29/06 (2006.01)
(52) U.S. Cl.
USPC .......................................... 380/278; 713/168
(58) Field of Classification Search
None
See application file for complete search history.

(56) References Cited

U.S. PATENT DOCUMENTS

| 6,611,913 B1 | 8/2003 | Carroll et al. |
| 2006/0224519 A1 | 10/2006 | Ahn |
| 2008/0005567 A1* | 1/2008 | Johnson .......................... 713/172 |

FOREIGN PATENT DOCUMENTS

| CN | 1841996 A | 10/2006 |
| CN | 1996832 A | 7/2007 |

OTHER PUBLICATIONS

GlobalPlatform Card Specification Version 2.2 Mar. 2006.
GlobalPlatform Card Specification v2.2 Amendment A Jan. 2011.

(Continued)

*Primary Examiner* — Gilberto Barron, Jr.
*Assistant Examiner* — Izunna Okeke
(74) *Attorney, Agent, or Firm* — Oppedahl Patent Law Firm LLC

(57) ABSTRACT

This invention discloses a key distribution method and system. The method includes: notifying, by an application provider management platform, a supplementary security domain of an application provider that is set on a smart card and corresponds to the application provider management platform to generate a public/private key pair including a public cryptographic key and a private cryptographic key; receiving, by the application provider management platform, the public cryptographic key from the supplementary security domain of the application provider that has been encrypted by the public key of the application provider obtained in advance and has been signed by a Controlling Authority Security Domain (CASD) on the smart card through a card issuer management platform; authenticating, by the application provider management platform, a signature and using the private key of the application provider to perform decryption to obtain the public cryptographic key; and sending, by the application provider management platform, a trust point's public key used for external authentication and a certificate of the supplementary security domain of the application provider to the supplementary security domain of the application provider after the trust point's public key and the certificate have been encrypted by the public cryptographic key of the supplementary security domain of the application provider and the encrypted data have been signed by the private key of the application provider, to complete distribution of a key of the supplementary security domain.

15 Claims, 3 Drawing Sheets

(56) References Cited

OTHER PUBLICATIONS

International Search Report in international application No. PCT/CN2009/073222, mailed on Nov. 26, 2009.
English Translation of the Written Opinion of the International Search Authority in international application No. PCT/CN2009/073222, mailed on Nov. 26, 2009.
Analysis of Near Field Communication Technology.
Printout of a web page from the Peer-to-Patent system, apparently created by a Mercedes Hobson on Nov. 19, 2011, citing a "Square Mobile Phone Credit Card Processing" web site.
Printout printed on Nov. 12, 2012 of a web page from the web site http://squareup.com/ entitled "Security Across All Levels", believed by applicant to be the web page cited in NPL#1 above. As stated in NPL#1 above, Mercedes Hobson suggests the publication date to be Jan. 1, 2009.
Printout of a web page from the Peer-to-Patent system, apparently created by a Mercedes Hobson on Nov. 19, 2011, citing an "Intuit Credit Card Payment Processing for Mobile Phones" web site.
Printout printed on Nov. 12, 2012 of a web page from the web site http://gopayment.com/ entitled "Intuit GoPayment", believed by applicant to be the web page cited in NPL#3 above. As stated in NPL#3 above, Mercedes Hobson suggests the publication date to be Jan. 1, 2009.

* cited by examiner

KEY DISTRIBUTION METHOD AND SYSTEM

TECHNICAL FIELD

The present invention relates to the field of communications, and particularly to a key distribution method and system.

BACKGROUND

In the related art, Near Field Communication (NFC) technique is a short-range wireless communication technique operating at 13.56 MHz. The technique is evolved from the fusion of Radio Frequency Identification (RFID) technique and interconnection technique. After being integrated with the NFC technique, mobile communication terminal such as mobile phone and the like can simulate non-contact Integrated Circuit (IC) card for application related to electronic payment. Moreover, the implementation of such solution on the mobile communication terminal requires is adding NFC analog front-end chip and NFC antenna to the terminal, and using a smart card supporting the electronic payment.

After being developed for more than ten years, the IC card, particularly the non-contact IC card, has been widely applied to fields such as public transport, access control, and small electronic payment, etc. In addition, after being rapidly developed for more than 20 years, the mobile phone has been applied extensively, and has brought significant convenience to people's work and life. Therefore, the application of the mobile phone to the field of electronic payment after being combined with non-contact IC card technique may further extend the usage range of the mobile phone and bring convenience to people's life, which has a wide application prospect.

In the related art, in order to implement mobile electronic payment based on the NFC technique, it is required to establish mobile terminal electronic payment system, and to implement management of mobile terminal electronic payment through the system. Specifically, the mobile terminal electronic payment system includes: issuing a smart card, downloading, installing and personalizing an electronic payment application, and adopting a related technique and management policy to implement security of the electronic payment.

Security domains are the representation of entities external to a card (including a card issuer and an application provider) on a smart card. They contain an cryptographic key used for supporting the operation of a security channel protocol and the management of card contents. If the electronic payment system supports Global platform Card Specification V2.1.1, the security channel protocol supports Secure Channel Protocol '02' (based on a symmetric key). If the electronic payment system supports Global platform Card Specification V2.2, the security channel protocol supports Secure Channel Protocol '10' (based on an asymmetric key). A security domain is responsible for its own cryptographic key management, which ensures that application and data from different application providers co-exist in the same card. When a key of a security domain adopts an asymmetric key mechanism, it is necessary for a certificate and a key of the security domain to include a public key (which can also be called a public cryptographic key) and a private key (which can is also be called a private cryptographic key) of the security domain, a certificate of the security domain, and a trust point's public key used for authenticating a certificate of an entity external to a card.

The security domain of an application provider on an intelligent card is a supplementary security domain. Before the electronic payment application of the application provider is downloaded and installed to the smart card, it is required on the smart card, to create a supplementary security domain of the application provider through an issuer security domain of the smart card that is owned by a card issuer, and then to set an cryptographic key of the supplementary security domain.

The cryptographic key of the security domain is confidential data, and it is required to employ a reliable and secure method and technique to import a relevant cryptographic key and certificate into the supplementary security domain, so as to implement secure distribution of the cryptographic key of the supplementary security domain. Specifically, the creation of the supplementary security domain requires a card issuer management platform to instruct creation of an issuer security domain on the smart card, and after the creation of the supplementary security domain is completed, the card issuer management platform needs to be responsible for setting and distributing an initial cryptographic key of the supplementary security domain.

When the supplementary security domain is created and the cryptographic key is distributed, a method adopted is as follows: the smart card establishes a communication with the card issuer management platform, and an application provider management platform establishes a communication with the card issuer management platform; the card issuer management platform instructs the issuer security domain of the smart card to establish the supplementary security domain, and a public/private key pair of the supplementary security domain is generated in the card by the supplementary security domain and is sent to the card issuer management platform; then, the card issuer management platform sends the cryptographic key generated by the supplementary security domain to the application provider management platform; the application provider management platform issues a certificate of the supplementary security domain according to the public key of the is supplementary security domain, and then imports the certificate of the supplementary security domain and the trust point's public key into the supplementary security domain through the card issuer management platform, thus completing the distribution of the key of the supplementary security domain.

But in such a situation, it is possible that when being responsible for data transfer, the card issuer management platform obtains data of the cryptographic key of the security domain that has been sent, and it may use the obtained key to execute operation on the supplementary security domain, which may result in a threat for the security of the electronic payment application of the application provider.

Therefore, there is an urgent need for a technical solution of solving a problem that the distribution of a key of a supplementary security domain is not secure.

SUMMARY

The present invention is made in consideration of the problem in the related art that the distribution of an cryptographic key of a supplementary security domain is not secure. Hence, a main object of the present invention is to provide an cryptographic key distribution method and system, so as to avoid the problem that the cryptographic key of the supplementary security domain is not secure for it is obtained by a card issuer management platform.

According to an aspect of the present invention, a key distribution method is provided.

The cryptographic key distribution method according to the present invention comprises:

notifying, by an application provider management platform, a supplementary security domain of an application provider that is set on a smart card and corresponds to the application provider management platform to generate a public/private key pair including a public cryptographic key and a private cryptographic key; receiving, by the application provider management platform, the public cryptographic key from the supplementary security domain of the application provider that has been encrypted by a public key of the application provider obtained in advance and has been signed by a is Controlling Authority Security Domain (CASD) on the smart card through a card issuer management platform; authenticating, by the application provider management platform, a signature and using a private key of the application provider to perform decryption to obtain the public cryptographic key; and sending, by the application provider management platform, a trustable root public key used for external authentication and a certificate of the supplementary security domain of the application provider to the supplementary security domain of the application provider after the trust point's public key and the certificate have been encrypted by the public key of the supplementary security domain of the application provider and the encrypted data have been signed by the private key of the application provider, to complete distribution of a cryptographic key of the supplementary security domain.

According to another aspect of the present invention, a cryptographic key distribution system is provided.

The cryptographic key distribution system according to the present invention comprises:

a card issuer management platform, which comprises:

a creating module, used for creating a supplementary security domain of an application provider on a smart card; and an information sending module, used for sending basic information of the supplementary security domain of the application provider to an application provider management platform, wherein the basic information includes configuration information and identification information of the supplementary security domain of the application provider;

the application provider management platform, which comprises:

a notifying module, used for notifying the supplementary security domain of the application provider that is set on the smart card and corresponds to the application provider management platform to generate a public/private key pair including a public cryptographic key and a private cryptographic key; a first receiving module, used for receiving the public cryptographic key from the supplementary security domain of the application provider, wherein the public cryptographic key has been encrypted by the public key of the application provider obtained in advance and has been signed by a is CASD on the smart card; a first obtaining module, used for authenticating a signature and using the private key of the application provider to perform decryption to obtain the public cryptographic key; and a first sending module, used for sending the supplementary security domain of the application provider a trust point's public key used for external authentication and a certificate of the supplementary security domain of the application provider that have been subjected to encryption by the public cryptographic key of the supplementary security domain of the application provider and to signing on encrypted data by the private key of the application provider;

the smart card, which is located at a mobile terminal and comprises the supplementary security domain of the application provider, wherein the supplementary security domain of the application provider further comprises: a second obtaining module, used for obtaining the public key of the application provider; a second sending module, used for sending the public key having been encrypted by the public key of the application provider and signed by the CASD to the application provider management platform; a second receiving module, used for receiving the trust point's public key used for external authentication and the certificate of the supplementary security domain of the application provider that have been subjected to encryption and signature processing; and a decrypting module, used for using the public key of the application provider to authenticate the signature for the data received by the receiving module, and if the authentication passes, using the private key of the supplementary security domain of the application provider to perform the decryption to obtain the trust point's public key used for external authentication and the certificate of the supplementary security domain of the application provider.

With the technical solutions of the present invention, the supplementary security domain of the application provider uses the public key of the application provider that has been obtained in advance to encrypt the cryptographic key of the supplementary security domain that is generated on the card and sends the same to the application provider management platform. The application provider management platform uses is the public key of the supplementary security domain of the application provider that has been obtained in advance to encrypt the trust point's public key and the certificate of the supplementary security domain of the application provider and sends the same to the supplementary security domain. Although the card issuer management platform is responsible for the data transmission between the supplementary security domain of the application provider and the application provider management platform, the card issuer management platform cannot obtain the private key of the supplementary security domain of the application provider and that of the application provider, and therefore cannot decrypt the data and further obtain the cryptographic key of the supplementary security domain. The isolation from the card issuer management platform is implemented, and the security of the distribution for the cryptographic key of the supplementary security domain of the application provider is effectively ensured.

BRIEF DESCRIPTION OF THE DRAWINGS

The illustration listed here are used to provide further understanding of the present invention, and constitute a part of this application. Exemplary embodiments of the present invention and description thereof are used for explaining the present invention, and are in no way intended to limit the present invention.

DETAILED DESCRIPTION OF THE INVENTION

Function Overview

A main idea of the present invention is as follows: a supplementary security domain of an application provider uses a public key of the application provider that has been obtained in advance to encrypt a key of the supplementary security domain that is generated in a card and sends the same to an application provider management platform; the application provider management platform obtains the public key of the supplementary security domain of the application provider in advance, and uses the public key to encrypt a trust point's public key used for external authentication and a certificate of the supplementary security domain of the application provider and sends to the supplementary security domain, so that a card issuer management platform cannot decrypt data because of incapability of obtaining a private key of the supplementary security domain of the application provider and that of the application provider and therefore cannot obtain the cryptographic key of the supplementary security domain; while a Controlling Authority Supplementary security domain (CASD) on a smart card is responsible for only authentication of the certificate and signature of the data, it is not aware of the private key of the supplementary security domain of the application provider and that of the application provider and cannot decrypt the data, and thus also cannot obtain the cryptographic key of the supplementary security domain. Therefore, isolation from the card issuer management platform is implemented during distribution of the cryptographic key of the supplementary security domain of the application provider, and security of the distribution of the cryptographic key of the supplementary security domain of the application provider is effectively ensured.

Preferred embodiments of the present invention are described hereinafter in combination with the illustration. It should be understood that the preferred embodiments described here are merely used for describing and explaining the present invention, and is not intended to limit the present invention.

System Embodiment

Figure 1:
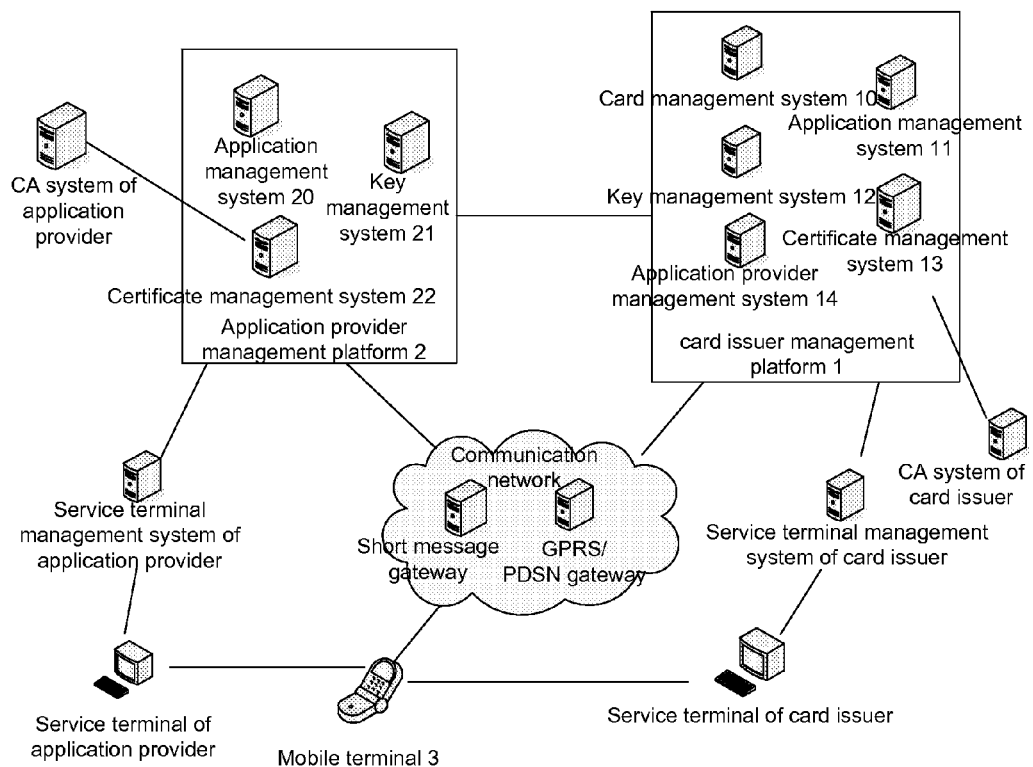
FIG. 1 is a structure block diagram illustrating a mobile terminal electronic payment system according to a system embodiment of the present invention.

As shown in FIG. 1, a mobile terminal electronic payment system according to an embodiment of the present invention is mainly composed of a card issuer management platform 1, an application provider management platform 2 and a mobile terminal 3 containing a smart card. There may be multiple application provider management platforms in the system.

Specifically, the card issuer management platform 1 includes a card management system 10, an application management system 11, a key management system 12, a certificate management system 13, and an application provider management system 14. Specifically, the certificate management system 13 is used in the event that the mobile terminal electronic payment system based on an NFC technique supports an asymmetric cryptographic key; the certificate management system 13 is connected with a card issuer CA (Certificate Authority) system; the application management system 11 is responsible for providing and managing the electronic payment application of a card issuer itself or the application of which is responsible for administration; and the application provider management system 14 may manage relevant information of an application provider, and specify a service privilege of the application provider, etc.

Moreover, the card issuer management platform 1 owned by the card issuer uses the certificate management system 13 only in the event that an asymmetric cryptographic key is supported. The card issuer management platform 1 is responsible for managing life cycle and resources of a card, cryptographic key and certificate, and is responsible for creating a supplementary security domain of the application provider.

The application provider management platform 2 includes an application management system 20, a key management system 21, a certificate management system 22. Specifically, the certificate management system 22 is connected with a CA system of the application provider, and used only in the event that an asymmetric key is supported. Furthermore, the application provider may provide various service applications through the application provider management platform 2, manage the security domain corresponding to it on the card, control data, a certificate, an application key of its security domain and the like and provide secure downloading of these applications. The application provider can be an operator, a bank, a public is transport company, a retailer, etc. In addition, the application provider may have a service terminal management system and a service terminal, and may provide a user with a service through the service terminal.

A smart card (unshown) supporting electronic payment is arranged in the mobile terminal 3. Furthermore, in order to implement functions such as security management of the smart card and downloading and installation of the payment application and the like, the smart card is required to establish a communication with the card issuer management platform 1 and the application provider management platform 2.

The communication of the smart card with the management platform (the card issuer management platform 1 and the application provider management platform 2 described above) may be implemented in two ways as follows: (1) the smart card uses a mobile communication network through the mobile terminal to establish the communication with the management platform; an Over The Air (OTA) technique is commonly adopted to implement the communication of the smart card with the management platform; (2) the connection of the smart card with the management platform is implemented through the service terminal of the management platform. The service terminal is configured with a non-contact card reader or a reader which can read the smart card directly, and the service terminal can establish a communication with the management platform, thus the communication of the smart card with the management platform is achieved.

In the mobile payment system described above, a user can download, install and use the electronic payment application, and by interacting with the card issuer management platform or the application provider management platform, the user operates the mobile terminal and the smart card, downloads and installs new application in the security domain, and uses various service applications provided by the card issuer management platform or the application provider management platform.

A mobile terminal electronic payment system based on an NFC technique supports multiple electronic payment applications, and a smart card can be provided with multiple electronic payment applications. In order to implement secure payment application, the smart card adopts Global Platform Card Specification V2.1.1/V2.2, and is separated into several independent security domains, so as to ensure independency and isolation among multiple applications. Respective application providers manage their own security domains, applications, application data, etc. The smart card mentioned here that supports the Global Platform standard refers to a smart card or an IC chip conforming to the Global Platform Card Specification V2.1.1/V2.2, and can physically be an SIM/USIM card, a removable intelligent memory card or an IC chip integrated into the mobile terminal.

Security domains are representation of entities external to a card (including the card issuer and the application provider) on the card. They contain cryptographic key used for supporting the operation of a security channel protocol and the management of card contents. The security domain is responsible for its own cryptographic key management, which ensures that the application and data from different application providers can co-exist in the same card. When an cryptographic key of a security domain adopts an asymmetric key mechanism, a certificate and an cryptographic key of the security domain are required to include a public key (which can also be called a public cryptographic key) and a private key (which can also be called a private cryptographic key) of the security domain, a certificate of the security domain, and a trust point's public key used for authenticating a certificate of an entity external to a card.

The security domain of the application provider on a smart card is a supplementary security domain. Before the electronic payment application of the application provider is downloaded and installed to the smart card, it is required on the smart card, to create a supplementary security domain of the application provider through an issuer security domain of the smart card that is owned by the card issuer, and then to set an cryptographic key of the supplementary security domain.

The key of the security domain is confidential data, and it is required to employ a reliable and secure method and technique to import a relevant cryptographic key and certificate into the supplementary security domain, so as to implement secure is distribution of the cryptographic key of the supplementary security domain. The supplementary security domain requires the card issuer management platform to instruct the creation of an issuer security domain on the smart card, and after the creation of the supplementary security domain is completed, the card issuer management platform is required to be responsible for setting and distributing an initial cryptographic key of the supplementary security domain.

Based on the electronic payment system described above, an embodiment of the present invention provides a key distribution system.

Figure 2:
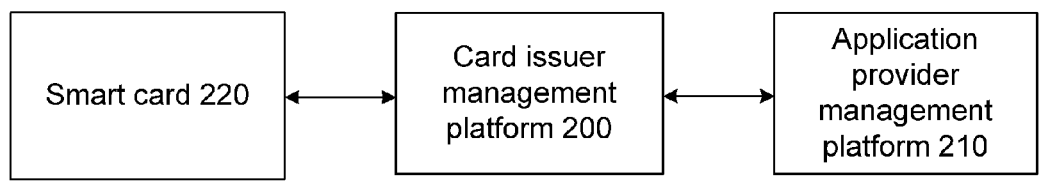
FIG. 2 is a block diagram illustrating an cryptographic key distribution system according to the system embodiment of the present invention.

FIG. 2 is a structure block diagram illustrating a key distribution system according to the system embodiment of the present invention. As shown in FIG. 2, the key distribution system according to this embodiment includes: a card issuer management platform 200, an application provider management platform 210 and a smart card 220.

The card issuer management platform 200 further includes:
a creating module, used for creating a supplementary security domain of an application provider on a smart card; and
an information sending module, used for sending basic information of the supplementary security domain of the application provider to an application provider management platform, wherein the basic information includes identification information and configuration information of the supplementary security domain of the application provider.

In the embodiment of the present invention, before the electronic payment application of the application provider is downloaded in the smart card, the application provider management platform is required to firstly check whether the supplementary security domain of the application provider exists in the smart card. If a corresponding supplementary security domain does not exist, the application provider management platform is required to request the card issuer management platform to create a supplementary security domain of the application provider on the smart card.

The application provider management platform 210 is connected to the card issuer management platform 200, and further includes:
a notifying module, which is used for notifying the supplementary security domain of the application provider that is set on the smart card and corresponds to the application provider management platform to generate a public-private key pair including a public key and a private key;
a first receiving module, which is used for receiving the public cryptographic key from the supplementary security domain of the application provider, wherein the public cryptographic key has been encrypted by the public key of the application provider that obtained in advance and has been signed by a CASD on the smart card;
a first obtaining module, which is used for authenticating a signature and using the private key of the application provider to perform decryption to obtain the public cryptographic key; and
a first sending module, which is used for sending the supplementary security domain of the application provider a trust point's public key used for external authentication and a certificate of the supplementary security domain of the application provider that have been subjected to the encryption by the public cryptographic key of the supplementary security domain of the application provider and to the signing on encrypted data by the private key of the application provider.

The smart card 220 is connected to the card issuer management platform 200. The smart card 220 is located at a mobile terminal and includes the supplementary security domain of the application provider, wherein the supplementary security domain of the application provider further includes:
a second obtaining module, used for obtaining the public key of the application provider;
a second sending module, used for sending the application provider management platform the public cryptographic key having been encrypted by the public key of the application provider and signed by the CASD;
a second receiving module, used for receiving the trust point's public key used for external authentication and the certificate of the supplementary security domain of the application provider that have been subjected to encryption and signature processing; and
a decrypting module, used for using the public key of the application provider to authenticate the signature for the data received by the receiving module, and if the authentication passes, using the private key of the supplementary security domain of the application provider to perform decryption.

Furthermore, the smart card 220 further includes the CASD for authenticating the certificate of the application provider and signing the public cryptographic key.

Preferably, in an actual application, the smart card may conform to the Global Platform Card Specification 2.2, the security domain of the smart card adopts an asymmetric cryptographic key mechanism, and an cryptographic key required to be imported into the created supplementary security domain includes the private key and the public key of the supplementary security domain, the certificate of the supplementary security domain and the trusted root public key used for external authentication (One Public Key for Trust Point for External Authentication, PK.TP_EX.AUT). The private key and the public key of the supplementary security domain are generated in the card by the supplementary security domain of the application provider. The certificate of the supplementary security domain is generated by the application provider management platform according to the public key of the supplementary security domain. The trusted root public key used for external authentication is provided by the CA issuing the certificate of the application provider and may be obtained from the application provider management platform, and the public key is used by the supplementary security domain for the authentication for the certificate of the application provider. The private key and the public key of the supplementary security domain may be generated by adopting an RAS algorithm, and both the length of the public key and the length of the private key are selected as 1024 bits.

It can be seen from the above description that in the cryptographic key distribution system of the present invention, the supplementary security domain of the application provider uses the public key of the application provider that has been obtained in advance to encrypt the cryptographic key of the supplementary security domain that is generated in the card and sends the same to the application provider is management platform. The application provider management platform uses the public key of the supplementary security domain of the application provider that has been obtained in advance to encrypt the trust point's public key and the certificate of the supplementary security domain of the application provider and sends the same to the supplementary security domain. Although the card issuer management platform is responsible for data transmission between the supplementary security domain of the application provider and the application provider management platform, the card issuer management platform cannot obtain the private key of the supplementary security domain of the application provider and that of the application provider, and therefore cannot decrypt the data and further obtain the cryptographic key of the supplementary security domain. The isolation from the card issuer management platform is implemented, and the security of the distribution of the cryptographic key of the supplementary security domain of the application provider is effectively ensured.

Method Embodiment

In this embodiment, a key distribution method is provided, which is applied to a communication system including an application provider management platform of an application provider, a card issuer management platform and a mobile terminal.

Figure 3:
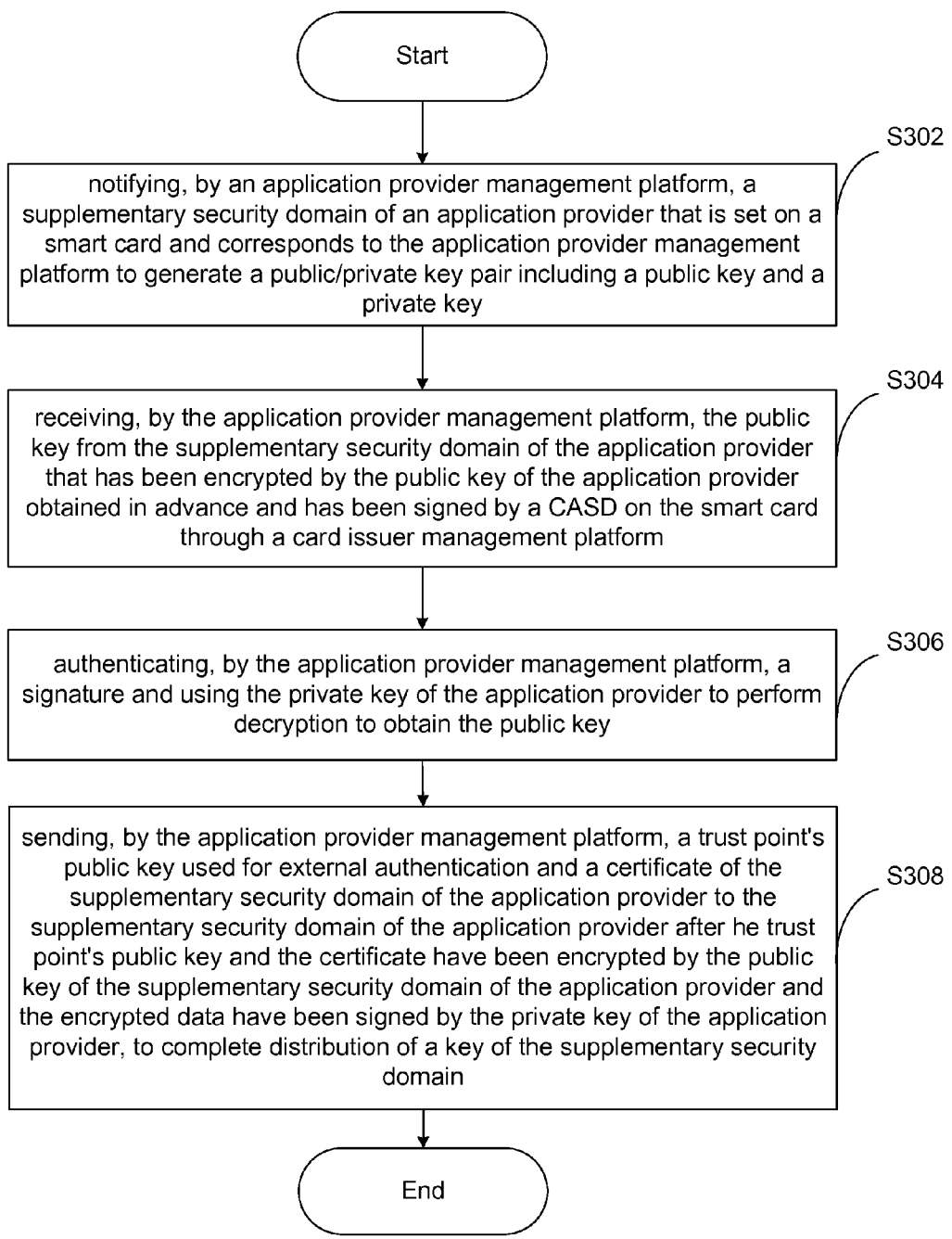
FIG. 3 is a flow chart illustrating an cryptographic key distribution method according to a method embodiment of the present invention.

FIG. 3 is a flow chart illustrating a key distribution method according to an embodiment of the present invention. As shown in FIG. 3, the method comprises the following processing from S302 to S308.

S302: notifying, by an application provider management platform, a supplementary security domain of an application provider that is set on a smart card and corresponds to the application provider management platform to generate a public/private key pair including a public cryptographic key and a private cryptographic key;

S304: receiving, by the application provider management platform, the public cryptographic key from the supplementary security domain of the application provider that has been encrypted by the public key of the application provider obtained in advance and has been signed by a CASD that is a trustable third-party supplementary security domain set on the smart card through a card issuer management platform;

S306: authenticating, by the application provider management platform, a signature and using the private key of the application provider to perform decryption to obtain the public cryptographic key; and S308: sending, by the application provider management platform, a trust point's public key used for external authentication and a certificate of the supplementary security domain of the application provider to the supplementary security domain of the application provider after the certificate and the trust point's public key have been encrypted by the public cryptographic key of the supplementary security domain of the application provider and the encrypted data have been signed by the private key of the application provider, to complete distribution of a key of the supplementary security domain.

According to the embodiment described above, the card issuer management platform and the CASD cannot obtain the private key of the supplementary security domain of the application provider and that of the application provider, and cannot decrypt data of the key, thus they cannot obtain the data of the cryptographic key of the supplementary security domain; as a result, the isolation from the card issuer management platform is implemented, and the secure distribution of the key of the supplementary security domain is effectively ensured.

Hereinafter, details of the processing described above are further described.

(1) S302

According to the present invention, in order to realize confidentiality, it is required to introduce a trustable third party into a smart card. The third party has a CASD on the smart card, and provides the application provider with services through the CASD. The CASD conforms to requirements specified in the Global Platform Card Specification V2.2. The CASD may provide the supplementary security domain of the application provider with an independent service interface, which includes certificate authentication, signature, data decryption and the like.

Preferably, the trustable third party is a CA issuing a certificate for respective application providers, and the CA has an independent CASD on the smart card. The certificate and the cryptographic key in the CASD includes: the private key and the is public key of the CASD, the certificate of the CASD, the trust point's public key of the CA that is used for authenticating the certificate of the application provider. The public and private keys of the CASD of the CA on the smart card are generated by the CA. The certificate of the CASD is issued and generated according to the public key of the CASD by the CA. The trust point's public key of the CA is provided by the CA. The CASD may be created and initialized in a secure manner when the smart card is issued, and the CA writes the trust point's public key of the CA, the certificate and the public and private keys of the security domain of the CASD into the security domain of the CASD. Specifically, the private key of the CASD can only be updated and cannot be read on the smart card. Therefore, the card issuer management platform and the application provider management platform cannot obtain the private key of the CASD.

According to the present invention, it is firstly required that the card issuer management platform notify the issuer security domain of the smart card to create a supplementary security domain. After the supplementary security domain is created, the card issuer management platform sends the basic information of the security domain to the application provider management platform.

Then, the application provider management platform obtains the certificate of the CASD, authenticates truthfulness of the certificate of the CASD and obtains the public key of the CASD from the certificate. The application provider management platform may use the public key to encrypt the data sent to the supplementary security domain of the application provider. After receiving the encrypted data, the supplementary security domain of the application provider decrypts the data by calling the service interface provided by the CASD. The CASD uses the private key of the CASD to decrypt the data, and returns the decrypted data to the supplementary security domain of the application provider.

Moreover, the application provider management platform sends its certificate to the supplementary security domain of the application provider through the card issuer management platform. The supplementary security domain of the application provider calls a certificate authentication interface provided by the CASD to authenticate the certificate of the application provider. The CASD uses the trust is point's public key of the CA to authenticate the certificate of the application provider, and if the authentication passes, returns identification information (ID) and the public key of the application provider to the supplementary security domain of the application provider.

The application provider management platform notifies the supplementary security domain of the application provider to generate a public/private key pair including a public cryptographic key (public key) and a private cryptographic key (private key) on the smart card. The supplementary security domain of the application provider produces the public key and the private key by calling an interface for generating an cryptographic key on the smart card, encrypts the generated cryptographic key by using the public key of the application provider, further signs the encrypted data through the security domain of the CASD, and then sends the same to the application provider management platform.

(2) S304 and S306

After receiving the data of the cryptographic key from the supplementary security domain of the application provider, the application provider management platform authenticates the signature and uses the private key of the application provider to decrypt the data, thus obtaining the public key of the supplementary security domain of the application provider.

(3) S308

Based on the processing described above, the application provider management platform issues the certificate of the supplementary security domain of the application provider according to the obtained public key of the supplementary security domain of the application provider, and uses the public key of the supplementary security domain of the application provider to encrypt the trust point's public key and the certificate of the supplementary security domain of the application provider, uses the private key of the application provider to sign the encrypted data and then sends the same to the supplementary security domain of the application provider through a message.

After receiving the data, the supplementary security domain of the application is provider uses the public key of the application provider to authenticate the signature and uses the private key of the supplementary security domain of the application provider to decrypt the data, thus obtaining the trust point's public key and the certificate of the security domain. The supplementary security domain of the application provider sets the trust point's public key and the certificate of the security domain in accordance with an instruction from the message, thus completing the distribution of the key of the supplementary security domain of the application provider.

It can be seen from the description described above that when transmitting communication data of the application provider management platform and the supplementary security domain, the card issuer management platform cannot decrypt the data and obtain the cryptographic key of the supplementary security domain for being unaware of the private key of the supplementary security domain and that of the application provider. Since the CASD on the smart card is responsible for only the authentication of the certificate and the signature of the data and is unaware of the private key of the supplementary security domain and the application provider, it cannot decrypt the data and therefore also cannot obtain the cryptographic key of the supplementary security domain. By the embodiments described above, the isolation from the card issuer management platform is implemented, and the secure distribution of the cryptographic key of the supplementary security domain of the application provider is effectively ensured.

In the process described above, the distribution of the cryptographic key and the creation of the supplementary security domain of the application provider can be implemented in an OTA manner. The application provider management platform and the card issuer management platform establish the connection with the smart card in an OTA manner, and transmit relevant command and data by OTA.

Moreover, the distribution of the cryptographic key and the creation of the supplementary security domain of the application provider can also be implemented by the service terminal of the card issuer. The smart card establishes the connection with the application provider management platform and the card issuer management is platform through the service terminal of the card issuer, and the service terminal transmits data such as a command, a response and the like between the smart card and the management platform. The command sent to the smart card by the application provider is sent to the smart card by the card issuer management platform, and the response sent by the smart card is obtained from the card issuer management platform.

Hereinafter, the cryptographic key distribution according to this embodiment is described in combination with a specific application example.

Figure 4:
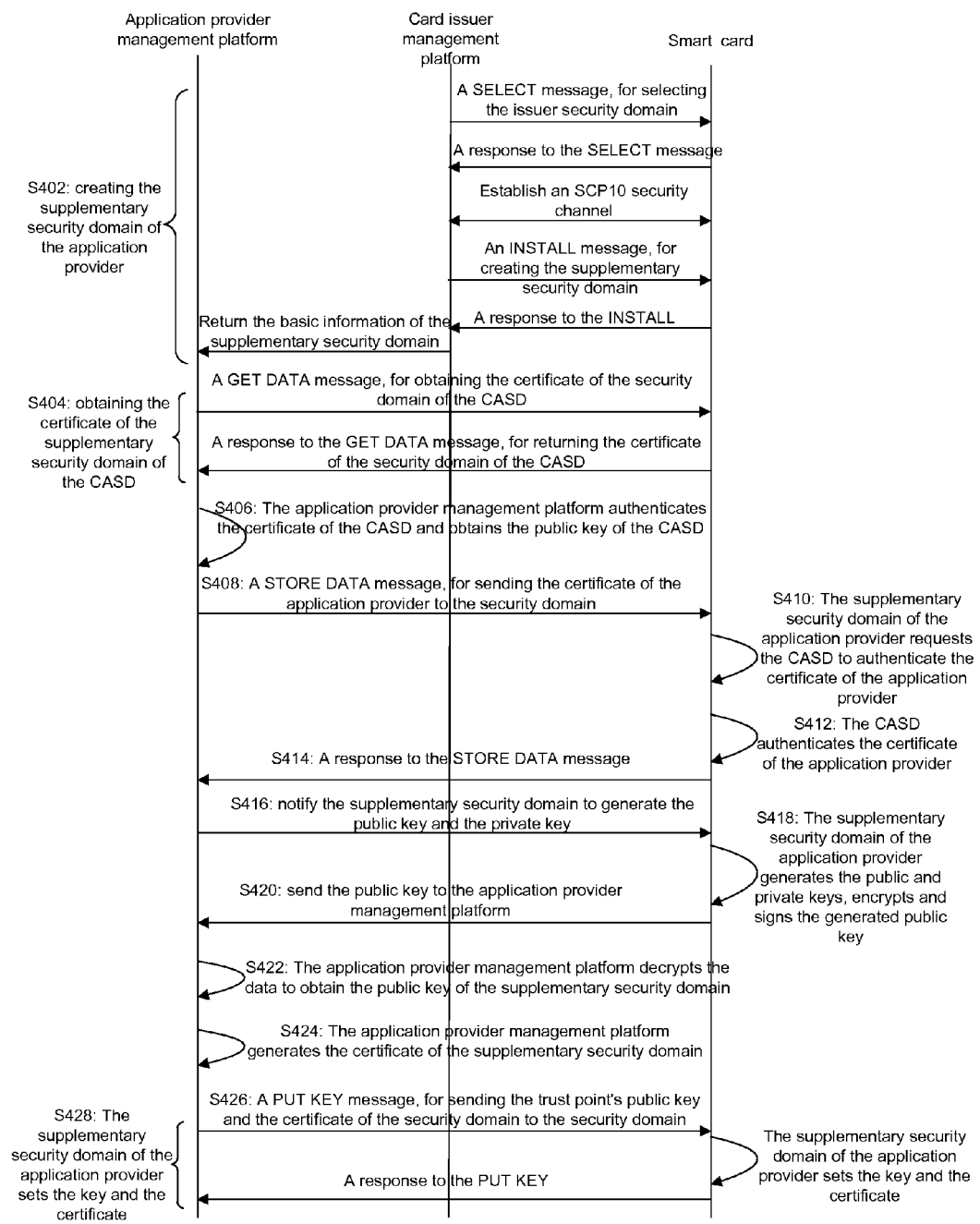
FIG. 4 is a flow chart illustrating a preferred processing scheme of the cryptographic key distribution method according to the method embodiment of the present invention.

FIG. 4 is a flow chart illustrating a preferred processing scheme of the key distribution method according to the embodiment of the present invention. As shown in FIG. 4, the processing specifically includes the following steps from S402 to S428.

S402: creating, by the card issuer management platform, the supplementary security domain of the application provider. The process of creating the supplementary security domain of the application provider may include:

(1) the card issuer management platform sends a SELECT message to the smart card, to select the issuer security domain of the smart card;

(2) the card issuer management platform and the issuer security domain of the smart card establish an SCP 10 security channel in accordance with requirements specified in an appended F Secure Channel Protocol '10' of the Global Platform Card Specification V2.2, to complete the authentication of the two parties and the negotiation of a session key;

(3) the card issuer management platform sends the creation message on supplementary security domain of the application provider INSTALL[for install]. The issuer security domain creates the supplementary security domain of the application provider in accordance with the instruction of the message; the ID (APSD_ID) of the supplementary security domain of the application provider management platform may be identical to the ID of the application provider management platform; and (4) after the creation of the supplementary security domain of the application provider is completed, the card issuer management platform sends the basic information of the created supplementary security domain of the application provider is to the application provider management platform, wherein the basic information includes the ID (APSD_ID) and the configuration information of the supplementary security domain of the application provider; after receiving the basic information of the supplementary security domain of the application provider, it is necessary for the application provider management platform to store the information of the supplementary security domain of the application provider in a database of the application provider management platform.

S404: the application provider management platform obtains the certificate of the CASD of the smart card from the smart card. The application provider may obtain the certificate of the CASD by sending a GET DATA (data obtaining) message to the smart card.

S406: the application provider management platform authenticates the certificate of the CASD and obtains the public key of the CASD. The application provider management platform may use the trust point's public key of the CA to authenticate the truthfulness of the certificate of the CASD and obtain the public key of the CASD from the certificate of the CASD.

S408: the application provider management platform sends its certificate to the supplementary security domain of the application provider through a STORE DATA (data storage) message and the card issuer management platform. In order to implement secure sending of the certificate, the application provider management platform may use the public key of the CASD to encrypt the certificate of the application provider.

S410: the supplementary security domain of the application provider requests the CASD to authenticate the certificate of the application provider.

S412: the CASD returns the ID of the application provider, the public key of the application provider and an authentication result to the supplementary security domain of the application provider.

S414: after the truthfulness of the certificate of the application provider is determined, the supplementary security domain sends a STORE DATA response to the application provider management platform.

S416: the application provider management platform notifies the supplementary security domain of the application provider to generate public and private keys.

S418: the supplementary security domain of the application provider produces the public key and the private key by calling the interface for generating an cryptographic key on the card, encrypts the generated public key by using the public key of the application provider, and then signs the encrypted data through the CASD.

S420: the supplementary security domain of the application provider sends the encrypted public key of the supplementary security domain of the application provider to the application provider management platform.

S422: the application provider management platform authenticates the signature and uses the private key of the application provider to decrypt the data, to obtain the public key of the supplementary security domain of the application provider.

S424: the certificate management system of the application provider management platform sends the certificate application information of the supplementary security domain of the application provider and the public key to the CA of the application provider, and the CA returns the certificate to the certificate management system after issuing the certificate of the supplementary security domain.

S426: the application provider management platform sends the trust point's public key used for external authentication and the certificate of the supplementary security domain of the application provider to the supplementary security domain through a PUT KEY (key setting) command. In a PUT KEY message, it is feasible that the public key of the supplementary security domain of the application provider is used to encrypt the trust point's public key and the certificate of the supplementary security domain of the application provider, and then the private key of the application provider is used to sign the encrypted data.

S428: after receiving the PUT KEY command, the supplementary security domain of the application provider authenticates the signature of the data and uses its private key to decrypt the data, and obtains the trust point's public key and the certificate of the supplementary security domain of the application provider, and then configures the certificate and the public key. After the configuration is completed, the supplementary security domain of the application provider sends a PUT KEY response message to the application provider management platform.

Moreover, after the steps described above are completed, processes such as the downloading and installation of the electronic payment application may be continued between the supplementary security domain and the application provider management platform.

To sum up, in light of the technical solutions of the present invention, in the cryptographic key distribution system of the present invention, the supplementary security domain of the application provider uses the public key of the application provider that is obtained in advance to encrypt the cryptographic key of the supplementary security domain that is generated on the card and sends the same to the application provider management platform. The application provider management platform uses the public key of the supplementary security domain of the application provider that is obtained in advance to encrypt the trust point's public key and the certificate of the supplementary security domain of the application provider and sends the same to the supplementary security domain. Although the card issuer management platform is responsible for the data transmission between the supplementary security domain of the application provider and the application provider management platform, the card issuer management platform cannot obtain the private key of the supplementary security domain of the application provider and the application provider, and therefore cannot decrypt the data and further obtain the cryptographic key of the supplementary security domain; as a result, the isolation from the card issuer management platform is implemented, and the security of the distribution of the cryptographic key of the supplementary security domain of the application provider is effectively ensured.

Of course, those skilled in the art should understand that respective steps or modules of the present invention may be implemented using a general computer device. They may be integrated into a single computer device or distributed on a network composed of multiple computer devices. Optionally, they may be is implemented using a program code executable to the computer device, thus, they may be stored in a storage device to be executed by the computer device, or they may be made into individual IC modules respectively, or multiple modules or steps thereof may be made into a single IC module for implementing this invention. In this way, the present invention is not limited to any particular combination of hardware and software.

The foregoing is merely the preferred embodiments of the present invention, and is not intended to limit the present invention. For those skilled in the art, there can be various alterations and changes for the present invention. Any modifications, equivalent substitutes, improvements and the like made within the spirit and principle of the present invention should be included in the scope of the present invention.

What is claimed is:

1. A key distribution method, comprising:
notifying, by an application provider management platform, a supplementary security domain of an application provider that is set on a smart card and corresponds to the application provider management platform to generate a public/private key pair including a public cryptographic key and a private cryptographic key;
receiving, by the application provider management platform, the public cryptographic key from the supplementary security domain of the application provider through a card issuer management platform, wherein the public cryptographic key has been encrypted by a public key of the application provider obtained in advance and has been signed by a Controlling Authority Supplementary security domain (CASD) that is a trustable third-party supplementary security domain on the smart card;

authenticating, by the application provider management platform, a signature and using a private key of the application provider to perform decryption to obtain the public cryptographic key; and sending, by the application provider management platform, a trust point's public key used for external authentication and a certificate of the supplementary security domain of the application provider to the supplementary security domain of the application provider after the trust point's public key and the certificate have been encrypted by the public cryptographic key of the supplementary security domain of the application provider and the encrypted data have been signed by the private key of the application provider, to complete distribution of an cryptographic key of the supplementary security domain wherein before the application provider management platform obtains the public key of the CASD, the method further comprising:

creating, by the application provider management platform, the supplementary security domain of the application provider on the smart card, and sending basic information of the supplementary security domain of the application provider to the application provider management platform, wherein the basic information includes identification information and configuration information of the supplementary security domain of the application provider.

2. The method according to claim 1, wherein before processing of notifying, by the application provider management platform, the supplementary security domain of the application provider to generate the public/private key pair, the method further comprising:

sending, by the application provider management platform, a certificate of the application provider to the supplementary security domain of the application provider, so as to make the supplementary security domain of the application provider authenticate the certificate of the application provider; and if the authentication of the certificate of the application provider passes, executing the processing of notifying, by the application provider management platform, the supplementary security domain of the application provider to generate the public/private key pair.

3. The method according to claim 2, wherein processing of sending, by the application provider management platform, the certificate of the application provider to the supplementary security domain of the application provider specifically comprises:

obtaining, by the application provider management platform, a public key of the CASD; and encrypting, by the application provider management platform, the certificate of the application provider using the public key of the CASD, and sending the encrypted certificate of the application provider to the supplementary security domain of the application provider through the card issuer management platform.

4. The method according to claim 3, wherein processing of obtaining, by the application provider management platform, the public key of the CASD specifically comprises:

obtaining, by the application provider management platform, the certificate of the CASD through the smart card; and authenticating, by the application provider management platform, the certificate of the CASD, and obtaining the public key of the CASD.

5. The method according to claim 2, wherein after the authentication of the certificate of the application provider passes by the supplementary security domain of the application provider, the method further comprising:

obtaining, by the supplementary security domain of the application provider, the public key of the application provider through the certificate of the application provider.

6. The method according to claim 5, wherein after the application provider management platform sends the trust point's public key used for external authentication and the certificate of the supplementary security domain of the application provider to the supplementary security domain of the application provider, the method further comprising:

receiving, by the supplementary security domain of the application provider, the trust point's public key used for external authentication and the certificate of the supplementary security domain of the application provider that have been subjected to encryption and signature processing; and using, by the supplementary security domain of the application provider, the public key of the application provider to authenticate the signature, and if the authentication passes, using the private key of the supplementary security domain of the application provider to perform the decryption to obtain the trust point's public key used for external authentication and the certificate of the supplementary security domain of the application provider.

7. The method according to claim 6, wherein the application provider management platform applies for the certificate of the supplementary security domain of the application provider from a Certificate Authority (CA) of the application provider.

8. A key distribution system, comprising:

a card issuer management platform, which further comprises a processor for implementing:

a creating module, used for creating a supplementary security domain of an application provider on a smart card; and an information sending module, used for sending basic information of the supplementary security domain of the application provider to an application provider management platform, wherein the basic information includes configuration information and identification information of the supplementary security domain of the application provider;

the application provider management platform, which further comprises a processor for implementing:

a notifying module, used for notifying the supplementary security domain of the application provider to generate a public/private key pair including a public cryptographic key and a private cryptographic key;

a first receiving module, used for receiving the public cryptographic key from the supplementary security domain of the application provider, wherein the public cryptographic key has been encrypted by the public key of the application provider obtained in advance and has been signed by a Controlling Authority Supplementary security domain (CASD) on the smart card;

a first obtaining module, used for authenticating a signature and using the private key of the application provider to perform decryption to obtain the public cryptographic key; and a first sending module, used for sending the supplementary security domain of the application provider a trust point's public key used for external authentication and a certificate of the supplementary security domain of the application provider that have been subjected to encryption by the public cryptographic key and to signing on encrypted data by the private key of the application provider;

the smart card, which is located at a mobile terminal and comprises the supplementary security domain of the application provider, wherein the supplementary security domain of the application provider further comprises:

a second obtaining module, used for obtaining the public key of the application provider;

a second sending module, used for sending the application provider management platform the public cryptographic key having been encrypted by the public key of the application provider and signed by the CASD;

a second receiving module, used for receiving the trust point's public key used for external authentication and the certificate of the supplementary security domain of the application provider that have been subjected to encryption and signature processing; and a decrypting module, used for using the public key of the application provider to authenticate the signature for the data received by the receiving module, and if the authentication passes, using the private key of the supplementary security domain of the application provider to perform the decryption to obtain the trust point's public key used for external authentication and the certificate of the supplementary security domain of the application provider;

wherein before the application provider management platform obtains the public key of the CASD, the application provider management platform further comprising:

a module used for creating the supplementary security domain of the application provider on the smart card, and sending basic information of the supplementary security domain of the application provider to the application provider management platform, wherein the basic information includes identification information and configuration information of the supplementary security domain of the application provider.

9. The system according to claim 8, wherein the smart card further comprises the CASD for authenticating the certificate of the application provider and signing the public cryptographic key.

10. The method according to claim 3, wherein after the authentication of the certificate of the application provider passes by the supplementary security domain of the application provider, the method further comprising:

obtaining, by the supplementary security domain of the application provider, the public key of the application provider through the certificate of the application provider.

11. The method according to claim 4, wherein after the authentication of the certificate of the application provider passes by the supplementary security domain of the application provider, the method further comprising:

obtaining, by the supplementary security domain of the application provider, the public key of the application provider through the certificate of the application provider.

12. The method according to claim 10, wherein after the application provider management platform sends the trust point's public key used for external authentication and the certificate of the supplementary security domain of the application provider to the supplementary security domain of the application provider, the method further comprising:

receiving, by the supplementary security domain of the application provider, the trust point's public key used for external authentication and the certificate of the supplementary security domain of the application provider that have been subjected to encryption and signature processing; and using, by the supplementary security domain of the application provider, the public key of the application provider to authenticate the signature, and if the authentication passes, using the private key of the supplementary security domain of the application provider to perform the decryption to obtain the trust point's public key used for external authentication and the certificate of the supplementary security domain of the application provider.

13. The method according to claim 11, wherein after the application provider management platform sends the trust point's public key used for external authentication and the certificate of the supplementary security domain of the application provider to the supplementary security domain of the application provider, the method further comprising:

receiving, by the supplementary security domain of the application provider, the trust point's public key used for external authentication and the certificate of the supplementary security domain of the application provider that have been subjected to encryption and signature processing; and using, by the supplementary security domain of the application provider, the public key of the application provider to authenticate the signature, and if the authentication passes, using the private key of the supplementary security domain of the application provider to perform the decryption to obtain the trust point's public key used for external authentication and the certificate of the supplementary security domain of the application provider.

14. The method according to claim 12, wherein the application provider management platform applies for the certificate of the supplementary security domain of the application provider from a Certificate Authority (CA) of the application provider.

15. The method according to claim 13, wherein the application provider management platform applies for the certificate of the supplementary security domain of the application provider from a Certificate Authority (CA) of the application provider.

* * * * *

UNITED STATES PATENT AND TRADEMARK OFFICE
CERTIFICATE OF CORRECTION

PATENT NO. : 8,532,301 B2  Page 1 of 1
APPLICATION NO. : 13/126174
DATED : September 10, 2013
INVENTOR(S) : Ma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 45 days.

Signed and Sealed this
Fifteenth Day of September, 2015

Michelle K. Lee
*Director of the United States Patent and Trademark Office*